Figure 1:
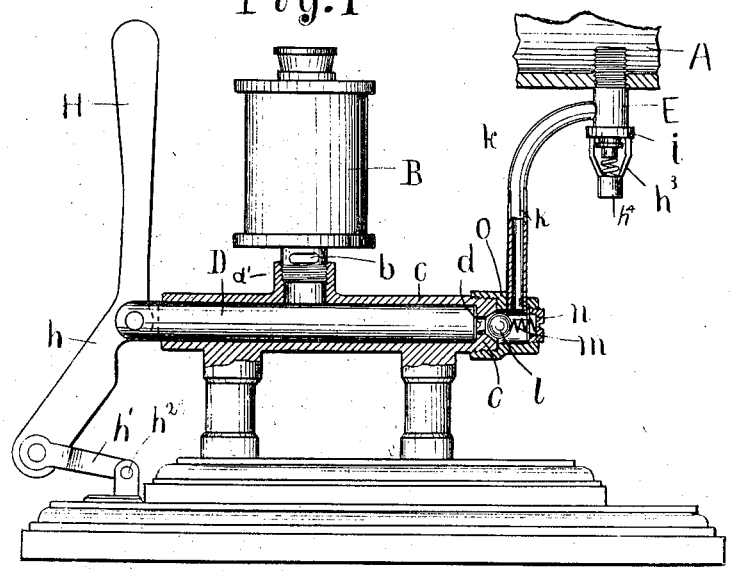

C. S. BAVIER.
PROCESS OF LUBRICATION.
APPLICATION FILED FEB. 8, 1910.

1,000,958.

Patented Aug. 15, 1911.
2 SHEETS—SHEET 1.

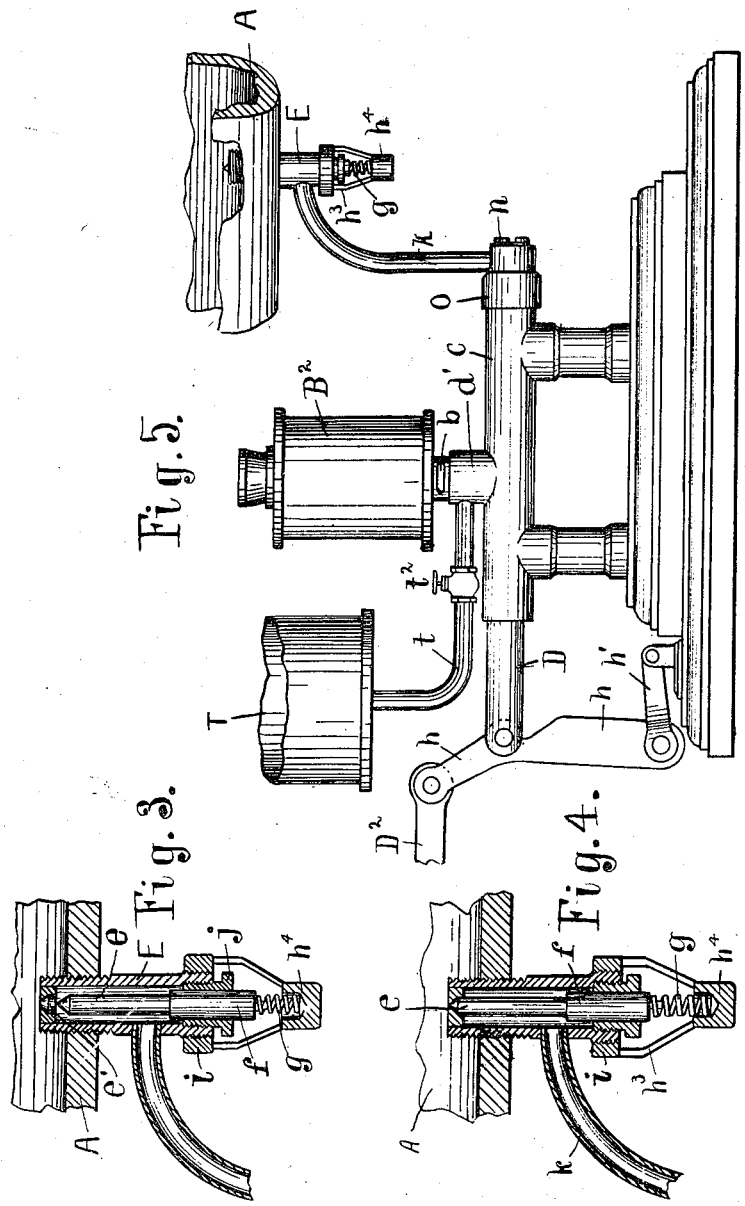

UNITED STATES PATENT OFFICE.

CHARLES S. BAVIER, OF NEW YORK, N. Y.

PROCESS OF LUBRICATION.

1,000,958.  Specification of Letters Patent.  Patented Aug. 15, 1911.

Original application filed March 6, 1908, Serial No. 419,603. Divided and this application filed February 8, 1910. Serial No. 542,794.

*To all whom it may concern:*

Be it known that I, CHARLES S. BAVIER, citizen of the United States, and a resident of the borough of Manhattan, in the county of New York and State of New York, have invented certain new and useful Improvements in Processes of Lubrication, of which the following is a specification.

This invention relates to improvements in processes of lubrication, this application being a division of that filed by me in the United States Patent Office, on March 6th, 1908, Serial Number 419,603.

It is the purpose of the invention to provide efficient lubrication of steam and other engines, without necessitating the use of injurious quantities of the lubricating agent. It is further the purpose of the invention to provide efficient lubrication for all classes of heat engines, including as well steam engines as internal combustion engines of various kinds, even those using an intense temperature such as certain engines for automobiles, motor boats and the like, in which the difficulty of efficient lubrication is particularly great.

The difficulty in the proper lubrication of engines arises principally from the difficulty of distributing the lubricant (which will hereinafter be briefly designated by the generic term "oil," whatever the nature of the particular lubricant may be) thoroughly over all the surfaces which require to be lubricated, for the oil naturally coalesces into drops at the end of the oil supplying pipe, which collect on certain parts of said surface and leave other parts thereof without lubrication. If the oil were thoroughly atomized and diffused through the steam or other agent which furnished the power, then the steam or other agent would effectively carry the atomized oil to all parts of the surface requiring lubrication, and effective lubrication would be effected with the minimum quantity of oil, without the waste and other evils arising from the use of excessive quantities of oil in the effort to secure lubrication of all parts of said surfaces. But heretofore such atomization of the oil has not been attained, particularly when the steam or other power-generating agent is used at very high pressures and temperatures; and when existing systems of lubrication are applied to certain types of internal combustion engines the use of excessive quantities of the lubricant results in very objectionable carbonizing in various parts of the engine.

The process which is the subject of this application, however, overcomes these difficulties and obtains thorough lubrication of all parts of the engine requiring lubrication by effecting the atomization of the oil in the power-generating medium, and its delivery by said medium to all parts of the surfaces requiring lubrication, and this is accomplished by mingling with the lubricant a substance having a lower temperature of vaporization than said lubricant. The mixture is subjected, by the heat to which it is exposed, as well as by mechanical means if desired, to a pressure greater than that in the chamber into which the lubricant is to be introduced, and the mixture is preferably fed into said chamber against a regulated resistance device, such as a properly weighted valve. Since the pressure of the mixture is greater than that of the medium in said chamber, the said substance which was mingled with the lubricant expands suddenly, as the mixture enters said chamber, with a kind of explosive force, tearing the particles or globules of the lubricant asunder and reducing said lubricant to the condition of an atomizer spray; and the perfect atomization of the lubricant is further promoted by the high temperature in said chamber. The lubricant being perfectly atomized diffuses through said power generating medium and is by it distributed over the entire surfaces requiring lubrication.

The process may be performed by various forms of apparatus, and particularly it may be performed either by placing the lubricant and the substance having a lower temperature of vaporization in separate receptacles, and causing them to mingle after being placed in their said separate receptacles, or by placing them both in one receptacle; and I therefore show several forms of apparatus in the accompanying drawings, without however intending to limit myself to any specific form of apparatus.

Figure 2:
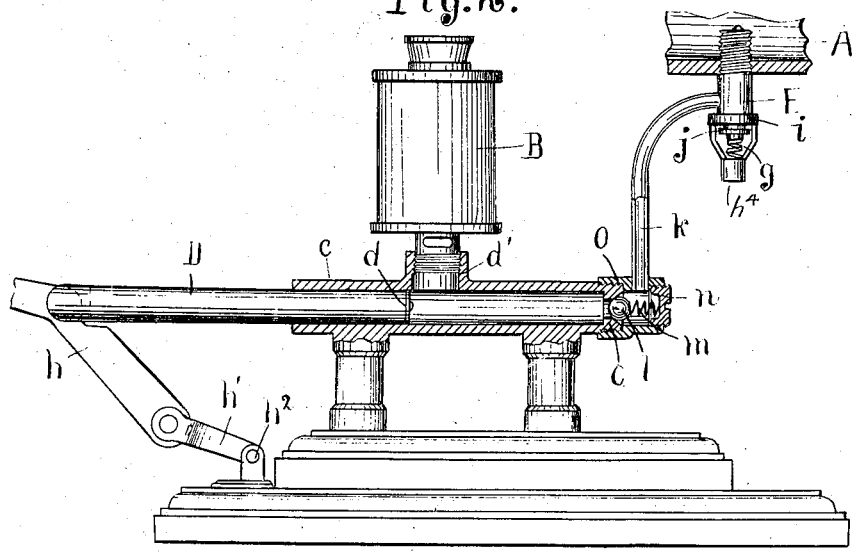

Referring to the accompanying drawings to aid the description, Figures 1 and 2 are sectional elevations respectively showing the plunger of the compressor at the end and near the beginning of its compression stroke. Figs. 3 and 4 are enlarged sectional details of the regulated resistance device respectively open and closed. Fig. 5 is an elevation, partly broken, of a form of apparatus particularly adapted to lubricating certain internal combustion engines in which the power-generating agent is used at high temperature and pressure. This figure also indicates the apparatus as adapted for operation from a prime-mover.

Referring to Figs. 1 and 2, the chamber A, shown partly broken, may be a steam main, or a cylinder, or other member of an engine or system operated by a gaseous agent, such as steam, explosive mixtures of air and other gases in automobile engines and the like. The oil is delivered to said chamber A in the manner now to be described.

B is a receptacle for the oil and the substance, having a lower temperature of vaporization, such as an oil cup of any suitable description provided with the air inlet $b$ and threaded into a boss $d'$ of a compressor C, which may be of any suitable description, and may be simply constructed as a reciprocating-plunger pump, the plunger D of which has a gas-tight fit in said pump by a washer $d$ and the least possible clearance when at the end of its compression stroke (Fig. 1). Said plunger D may be reciprocated in any suitable manner, by hand or by mechanical power, as by a handle or lever H, the extension $h$ of which is pivoted to link $h'$ fulcrumed at $h^2$. The end $c$ of the pump barrel is provided with a hole opening into said pump barrel and with a valve seat on which seats a valve $l$, opening outward and normally held to its seat by a spring $m$, held and regulated by a screw plug $n$, threaded into screw cap $o$ of said pump barrel. The space outside valve $l$ connects by a pipe $k$ with a valve-nozzle or chamber E, which extends well into said chamber A so as to be heated by the hot gases (whether steam or other gas) in said chamber A, and in practice I may extend said nozzle E even farther into said chamber A than is indicated in the drawings, or may construct it so as to increase its heating surface. Said nozzle E has an orifice $e'$, opening into said chamber A and normally closed by a resistance valve $e$ which is held to its seat by a regulated force in opposition to the effect of the mixture coming from the pump C to open it; and this force is conveniently a spring $g$ held in the socket cap $h^4$ fixed by arms $h^3$ to a nut $i$ which threads on the end of said nozzle E. Said valve $e$ has an enlarged stem $f$, which provides shoulders to be pressed upon by the said mixture, and said stem $f$ passes, properly packed, through a gland $j$. The force tending to press valve $e$ to its seat is therefore regulated by adjusting said cap $h^4$.

The process is operated by the said apparatus as follows: The commingled lubricant and substance of lower temperature of evaporation such as gasolene, or water, for example, feed drop by drop from said receptacle B into said pump or compressor C, said plunger D being drawn back to open the communication from said receptacle B to said compressor. At the proper time said plunger D is thrown forward, compressing said mixture of lubricant and substance, together with any air which may have entered compressor C through the sight feed opening $b$ and connection $d'$, and forcing said mixture past said check valve $l$ into said conduit $k$, and into the nozzle E, which is intensely heated by the high temperature of the power-generating medium in chamber A and constitutes a heating chamber. By reason of the high temperature of said mixture in nozzle E, as well as the compression due to the operation of said plunger D, the pressure of said mixture becomes greater than the pressure of the power-generating medium in said chamber A, and greater than all resisting loads on the terminal valve and said valve opens, allowing said mixture to escape into said chamber A. But immediately upon said valve opening, the said pressure being relieved, said substance expands with a kind of explosive violence, atomizes the lubricant and dissipates it as a mist into the power-generating medium, which conveys the lubricant to all parts of the surfaces requiring lubrication.

Referring to Fig. 5, which shows apparatus arranged to be actuated from any motor or engine, and in proper unison therewith, by a connecting rod $D^2$ from any suitable part of said motor or engine, to the rocking lever $h$, most of the parts of the apparatus are similar to those hereinbefore described and illustrated in Figs. 1, 2, 3 and 4 inclusive, but a separate receptacle T, of any suitable construction and material, is now provided for the substance having a lower point of vaporization than the lubricant, and said receptacle T is connected with the compressor C by a pipe $t$ controlled by valve $t^2$ and tapped into the boss $d'$, with which boss the oil cup or other receptacle $B^2$ for the lubricant may also be connected. With this construction the said lubricant and substance intermingle as they enter the compressor, or therein, and the mixture, together with any air that has entered through the sight feed opening, if any has, is forced, as before, by plunger D into nozzle E, heated and opens valve $e$ and escapes into chamber A, and the explosive-like action of the expanding substance atomizes the lubricant as before, the power-generating medium distributing it as before over all the surfaces requiring lubrication.

The temperature to which the mixture is heated will generally be higher than that of the temperature of vaporization of the substance which is mixed with the said lubricant, the explosive force of the said substance when the mixture is entering chamber A being thereby increased.

It will of course be understood that the compressor can be operated by mechanical power as well as by hand, and other changes can be made in the apparatus.

Now having described my improvements, I claim as my invention.

The process of lubricating heat engines, consisting in mixing lubricant and a material having a lower temperature of vaporization outside of the space to be lubricated, compressing the mixture outside of said space, heating the mixture and relieving the pressure thereof outside of said space, and allowing said material to expand at substantially the instant when the mixture is admitted to said space, whereby the lubricant is atomized in the power generating medium, substantially as described.

Signed at New York city, in the county of New York, and State of New York, this 31st day of January A. D. 1910.

CHARLES S. BAVIER.

Witnesses:
EMANUEL WEIL,
THOS. G. LEONARD.